United States Patent Office 2,770,640
Patented Nov. 13, 1956

2,770,640

CYANOETHYLATION OF KETONES

Glen E. Journeay, Texas City, Tex., assignor to Monsanto Chemical Company, St. Louis, Mo., a corporation of Delaware No Drawing. Application September 23, 1954,
Serial No. 458,005

17 Claims. (Cl. 260—464)

This invention relates to cyanoethylated ketones in which one or more of the active hydrogen atoms attached to a carbon atom immediately adjacent to the keto or carbonyl group have been substituted by a cyanoethyl group and a method for producing them.

According to the invention, $\beta,\beta'$-oxydipropionitrile is reacted in the presence of a strongly alkaline catalyst with a ketone having one or more active hydrogen atoms attached to a carbon atom immediately adjacent to the carbonyl group whereby said active hydrogen or hydrogens are replaced by a $\beta$-cyanoethyl group or groups, as the case may be. A wide variety of ketones are suitable for the practice of the invention. Both saturated and unsaturated mono- and polyketones from the aliphatic, cyclo aliphatic, arylaliphatic, and aromatic series may be employed. The ketones may contain other functional groups in addition to the carbonyl group as long as such groups do not destroy the alkaline catalyst used. For example, these groups may be chloro, bromo, acyl, alkoxy, aryloxy, carbamyl, cyano, and the like. Among the large number of ketones falling within the class described, the following may be enumerated as typical: acetone, methyl ethyl ketone, methyl propyl ketone, cyanoacetone, ethoxyacetone, acetonylacetone, diacetone alcohol, methyl isobutyl ketone, diethyl ketone, diisopropyl ketone, diisobutyl ketone, methyl-n-amyl ketone, methyl-n-hexyl ketone, cyclopentanone, methylcyclohexanone, methyl-cyclopentanone, cyclohexanone, o-methylallylcyclohexanone, phenylcyclohexanone, cyclohexylcyclohexanone, benzylcyclohexanone, phorone, isophorone, $\alpha$- and $\beta$-ionone, methyl vinyl ketone, methyl isopropenyl ketone, methyl propenyl ketone, mesityl oxide, chloroacetone, acetophenone, benzophenone, methyl 2-naphthyl ketone, propiophenone, butyrophenone, p-acetyl biphenyl, p-methylacetophenone, p-methoxyacetophenone, p-chloroacetophenone, p-bromoacetophenone, acetoacetic ester, acetoacetic nitrile, acetoacetic amide, acetyl-p-cymene, dibenzyl ketone, and the like.

The strongly alkaline catalysts which are effective for promoting the reaction are the oxides, hydroxides, carbonates, phosphates, cyanides, amides and alcoholates of the alkali metals or the alkali metals themselves. Included in this category are, for example, sodium hydroxide, potassium hydroxide, lithium hydroxide, sodium oxide, sodamide, potassium ethylate, sodium cyanide, potassium carbonate, potassium tertiary amylate, and the like. Also suitable are the strongly basic non-metallic hydroxides such as the quaternary ammonium hydroxides among which may be mentioned trimethylbenzylammonium hydroxide (available commercially under the trade name of "Triton B"), benzyltriethylammonium hydroxide, dimethyldibenzylammonium hydroxide, and the like.

The quantity of alkaline catalyst required is relatively small, amounts in the range from about 0.1% to about 20% of the combined weights of the reactants being required. In practice, amounts ranging from about 0.5% to about 10% are preferred.

The reaction is carried out most conveniently by adding the $\beta,\beta'$-oxydipropionitrile to the alkaline solution of the ketone. This procedural step is not essential, however, since the order of addition of the reactants, or the stage of the process at which the catalyst is added are not critical. All reactants may be charged to the reactor simultaneously, or good results may be secured by adding the alkaline catalyst to a mixture of the reagents, or by adding both the ketone and the oxydipropionitrile to a medium containing the catalyst. In the latter case, the medium may be an inert solvent such as dioxane, benzene, tert.-butyl alcohol, or like materials.

The cyanoethylation of ketones takes place readily at temperatures from about 0° C. upwards to about 150° C. Preferably, the temperature is maintained in the range from about 25° C. to about 100° C. Atmospheric pressure is usually employed but pressures in excess of atmospheric may be used in cases where the process may be operated more efficiently or conveniently under pressure.

Some variation is permissible in the ratio of reactants to be employed. At least equimolecular proportions are required to secure the monocyanoethylated product when there is only one active hydrogen on the carbon atom adjacent to the carbonyl group of the ketone reacted. Even in this case, however, an excess of $\beta,\beta'$-oxydipropionitrile is to be preferred. In cases where there are two or more active hydrogens to be replaced by two or more cyanoethyl groups, larger quantities of the nitrile must be employed. In general, to secure predominance of the higher cyanoethylated product, the ratio of $\beta,\beta'$-oxydipropionitrile to ketone should be in the range from about 3:1 to about 10:1, and preferably from about 3:1 to about 6:1. In nearly every case, the product will probably also include some minor proportions of the lower cyanoethylated products as well.

The following examples are given to illustrate the process of the invention and are not intended to limit it in any manner except as it is limited in the appended claims. All parts are by weight.

*Example I*

A solution of 42.6 parts of $\beta,\beta'$-oxydipropionitrile and 0.48 part of sodium hydroxide is heated in a suitable vessel to a temperature of approximately 50° C. and 5.8 parts of acetone is then added dropwise over a period of about 3 hours at that temperature while the solution is stirred. The reaction mixture is maintained at 50° C. for an additional six hours and the reaction product is then recovered from the reaction mixture. Upon crystallization from glycol monomethyl ether, for example, a good yield of fine white crystals of tri ($\beta$-cyanoethyl) acetone is recovered.

*Example II*

A mixture consisting of 36 parts of methyl ethyl ketone, 213.1 parts of $\beta,\beta'$-oxydipropionitrile, and about 3 parts of potassium hydroxide is charged to a reactor of suitable capacity equipped with a stirrer and a reflux condenser. Sufficient heat is applied to the reactor to bring the contents to reflux temperature and the mixture is allowed to reflux for a period of about 5 hours. The oily reaction product is distilled to give a fraction which may be solidified to a crystalline mass. By recrystallization a good yield of high-purity di-($\beta$-cyanoethyl)butanone is obtained.

*Example III*

Substantially 142 parts of $\beta,\beta'$-oxydipropionitrile is introduced slowly at about 40° C. into a solution of 19.6 parts of cyclohexanone in 100 parts of dioxane, to which about 0.8 part of benzyltriethylammonium hydroxide has been added, while stirring. The crystalline material obtained is filtered off and washed with methanol. After recrystallization from glacial acetic acid, a good yield of the product, tetra($\beta$-cyanoethyl)cyclohexanone, is obtained.

Example IV

The procedure of Example III is repeated with the exception that only 30 parts of $\beta,\beta'$-oxydipropionitrile is used. The oily product, in this instance, contains predominantly mono-($\beta$-cyanoethyl)-cyclohexanone and a small amount of the di-($\beta$-cyanoethyl)cyclohexanone.

Example V

To a solution of 60 parts of acetophenone in 60 parts of t-butyl alcohol containing approximately 4 parts of sodium hydroxide is added 284 parts of $\beta,\beta'$-oxydipropionitrile dropwise during 4 hours while the mixture is stirred and the temperature is maintained between 40° C. and 80° C. After addition of the $\beta,\beta'$-oxydipropionitrile is completed, the mixture is stirred for another hour and then filtered. Tris-($\beta$-cyanoethyl)methyl phenyl ketone, the product of the reaction, is obtained in the form of colorless needles upon recrystallization from glycol monoethyl ether. Some small amount of lower cyanoethylated material is also obtained if the original filtrate is worked up.

Example VI $\beta,\beta'$-Oxydipropionitrile (142 parts) is added dropwise to a stirred solution of 170 parts of methyl 2-naphthyl ketone in 500 parts of dioxane and 3 parts of sodium hydroxide over a period of about two hours while the reaction mixture is stirred and the temperature is maintained between 50° C. and 65° C. The mixture is stirred for another 5-hour period, then worked up as in the previous examples above to recover the cyanoethylated product of the formula

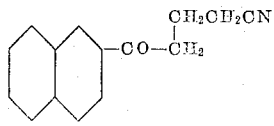

Some small amounts of the di- and tri-cyanoethylated products are also probably formed.

Example VII

One-half mole (65 g.) of ethyl acetoacetate is charged to a reactor containing 200 g. of benzene and approximately 5 g. of sodamide. The mixture is brought up to a temperature of about 60° C. and, while that temperature is maintained, two moles (284 g.) of $\beta,\beta'$-oxydipropionitrile is introduced slowly with constant stirring over a period of 3 to 4 hours. After the addition of the nitrile is completed, the mixture is stirred for another two hours and then cooled. Upon cooling, the di-($\beta$-cyanoethyl)acetoacetic ethyl ester

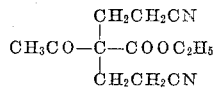

separates out as a crystalline mass and may be recovered as a relatively pure compound by recrystallization from ethanol.

Example VIII

Using 34 parts of 2-ethoxyacetone, 200 parts of dioxane, 2 parts of sodium oxide, and 142 parts of $\beta,\beta'$-oxydipropionitrile and following the procedure of Example VII, there is obtained upon recrystallization of the crystalline reaction mass, a good yield of 2-ethoxy-2,2-di-(2-cyanoethyl)acetone.

Example IX

Following the method of Example V, 142 g. of $\beta,\beta'$-oxydipropionitrile (1 mole) is slowly run into a solution of approximately 39 parts of p-chloroacetophenone, 100 parts of dioxane, and 2 parts of sodium hydroxide. During the introduction of the nitrile and in the stirring period after addition is completed, the temperature of the reactor contents is maintained between 40° and 80° C. The reaction product, tris($\beta$-cyanoethyl)-methyl p-chlorophenyl ketone is readily obtained in the crystalline form and in good yield.

Example X

Into a mixture of 80 parts of propiophenone in 200 parts of benzene, to which has been added 5 parts of benzyltriethylammonium hydroxide, there is flowed gradually over a period of 3–4 hours, 150 parts of $\beta,\beta'$-oxydipropionitrile while the mixture is stirred and the temperature is maintained at about 30° C. The resulting crystalline mass is stirred for an additional 5 hours at 30° C., filtered off, and recrystallized from ethanol to give di-($\beta$-cyanoethyl)propiophenone.

The products obtained by the process of the invention are useful intermediates in the preparation of monocarboxylic or polycarboxylic acids. The esters of such acids find applications as plasticizers or solvents. In addition, amides, esters, amines or polyamines, amidines, amino acids and amino alcohols may all be produced from the compounds made by the process of the invention by the usual reactions characteristic of the nitrile group. The cyanoethylated ketones are also suitable for use in the fields of synthetic resins, plastics, artificial fibers, textile treating, pharmaceuticals, insecticides, and in other commercial applications.

What is claimed is:

1. A process for the cyanoethylation of ketones which comprises reacting $\beta,\beta'$-oxydipropionitrile with a ketone having at least one active hydrogen atom attached to a carbon atom adjacent to the ketonic carbonyl group in the presence of a strongly alkaline catalyst.

2. A process for the cyanoethylation of ketones which comprises reacting $\beta,\beta'$-oxydipropionitrile with a ketone having at least one active hydrogen atom attached to a carbon atom adjacent to the ketonic carbonyl group in the presence of a strongly alkaline catalyst at a temperature from about 0° to about 150° C.

3. A process for the cyanoethylation of ketones which comprises reacting $\beta,\beta'$-oxydipropionitrile with a ketone having at least one active hydrogen atom attached to a carbon atom adjacent to the ketonic carbonyl group in the presence of a strongly alkaline catalyst at a temperature from about 25° to about 100° C.

4. A process for the cyanoethylation of ketones which comprises reacting $\beta,\beta'$-oxydipropionitrile with a ketone having at least one active hydrogen atom attached to a carbon atom adjacent to the ketonic carbonyl group in the presence of a strongly alkaline catalyst at a temperature from about 0° to about 150° C. and in quantities such that the mole ratio of $\beta,\beta'$-oxydipropionitrile to said ketone is in the range from about 3:1 to about 10:1.

5. A process for the cyanoethylation of ketones which comprises reacting $\beta,\beta'$-oxydipropionitrile with a ketone having at least one active hydrogen atom attached to a carbon atom adjacent to the ketonic carbonyl group in the presence of a strongly alkaline catalyst at a temperature from about 25° to about 100° C. and in quantities such that the mole ratio of $\beta,\beta'$-oxydipropionitrile to said ketone is in the range from about 3:1 to 6:1.

6. The process of claim 4 in which the strongly alkaline catalyst is the hydroxide of an alkali metal.

7. The process of claim 5 in which the strongly alkaline catalyst is the hydroxide of an alkali metal.

8. A process for the cyanoethylation of acetone which comprises reacting $\beta,\beta'$-oxydipropionitrile with acetone in the presence of a strongly alkaline catalyst.

9. A process for the cyanoethylation of acetone which comprises reacting $\beta,\beta'$-oxydipropionitrile with acetone in the presence of the hydroxide of an alkali metal, at a temperature from about 25° C. to about 100° C., and in such quantities that the mole ratio of β,β'-oxydipropionitrile to acetone is in the range from about 3:1 to about 6:1.

10. A process for the cyanoethylation of cyclohexanone which comprises reacting β,β'-oxydipropionitrile with cyclohexanone in the presence of a strongly alkaline catalyst.

11. A process for the cyanoethylation of cyclohexanone which comprises reacting β,β'-oxydipropionitrile with cyclohexanone in the presence of the hydroxide of an alkali metal, at a temperature from about 25° C. to about 100° C., and in such quantities that the mole ratio of β,β'-oxydipropionitrile to cyclohexanone is in the range from about 3:1 to about 6:1.

12. A process for the cyanoethylation of acetophenone which comprises reacting β,β'-oxydipropionitrile with acetophenone in the presence of a strongly alkaline catalyst.

13. A process for the cyanoethylation of acetophenone which comprises reacting β,β'-oxydipropionitrile with acetotophenone in the presence of the hydroxide of an alkali metal, at a temperature from about 25° C. to about 100° C., and in such quantities that the mole ratio of β,β'-oxydipropionitrile to acetophenone is in the range from about 3:1 to about 6:1.

14. A process for the cyanoethylation of methyl 2-naphthyl ketone which comprises reacting β,β'-oxydipropionitrile with methyl 2-naphthyl ketone in the presence of a strongly alkaline catalyst.

15. A process for the cyanoethylation of methyl 2-naphthyl ketone which comprises reacting β,β'-oxydipropionitrile with methyl 2-naphthyl ketone in the presence of the hydroxide of an alkali metal, at a temperature from about 25° C. to about 100° C., and in such quantities that the mole ratio of β,β'-oxydipropionitrile to methyl 2-naphthyl ketone is in the range from about 3:1 to about 6:1.

16. A process for the cyanoethylation of ethylacetoacetate which comprises reacting β,β'-oxydipropionitrile with ethylacetoacetate in the presence of a strongly alkaline catalyst.

17. A process for the cyanoethylation of ethylacetoacetate which comprises reacting β,β'-oxydipropionitrile with ethylacetoacetate in the presence of the hydroxide of an alkali metal, at a temperature from about 25° C. to about 100° C., and in such quantities that the mole ratio of β,β'-oxydipropionitrile to ethylacetoacetate is in the range from about 3:1 to about 6:1.

References Cited in the file of this patent

UNITED STATES PATENTS

| | | |
|---|---|---|
| 2,386,736 | Bruson | Oct. 9, 1945 |
| 2,394,962 | Bruson | Feb. 12, 1946 |
| 2,437,906 | Bruson et al. | Mar. 16, 1948 |